United States Patent [19]
Ramsey, III

[11] 3,720,201
[45] March 13, 1973

[54] DISPOSABLE BODY FLUID PRESSURE MONITOR

[75] Inventor: Maynard Ramsey, III, Durham, N.C.

[73] Assignee: Ramtech, Inc., Tampa, Fla.

[22] Filed: Oct. 28, 1970

[21] Appl. No.: 84,718

Related U.S. Application Data

[63] Continuation-in-part of Ser. No. 881,121, Dec. 1, 1969, Pat. No. 3,648,687.

[52] U.S. Cl. ............................ 128/2.05 D, 73/409
[51] Int. Cl. ................................................ A61b 5/02
[58] Field of Search ....... 128/2.05 D, 2.05 E; 215/82, 215/94; 73/402, 406, 409

[56] References Cited

UNITED STATES PATENTS

| | | | |
|---|---|---|---|
| 2,535,998 | 12/1950 | Bierman | 128/2.05 D |
| 2,066,889 | 1/1937 | Kay | 215/82 X |
| 2,600,324 | 6/1952 | Rappaport | 128/2.05 D |
| 2,648,328 | 8/1953 | Hathaway et al. | 128/2.05 D |
| 3,418,853 | 12/1968 | Curtis | 128/2.05 E |
| 2,866,453 | 12/1958 | Jewett | 128/2.05 D |

FOREIGN PATENTS OR APPLICATIONS 227,741   1/1925   Great Britain ..................... 215/82

OTHER PUBLICATIONS

Anesthesiology, Vol. 18, No. 6, Nov.–Dec., 1957, pp. 906–907.
Surgery, Vol. 61, 1967, May, pp. 711–712.
Surgery, Vol. 64, No. 6, Dec., 1968, p. 1161.

Primary Examiner—Kyle L. Howell
Attorney—Fleit, Gipple & Jacobson

[57] ABSTRACT

A pressure monitoring device is disclosed which is designed to be discarded after each use. This device utilizes a tube which is separated by a flexible diaphragm. One end of the tube is attached to the source of pressure, and the distal end is attached to a pressure sensing device. The pressure sensing device is of any standard reusable type and it does not require sterilization. The tube and its components are made of inexpensive, sterilizable material and are designed to be disposed of after one use.

8 Claims, 5 Drawing Figures

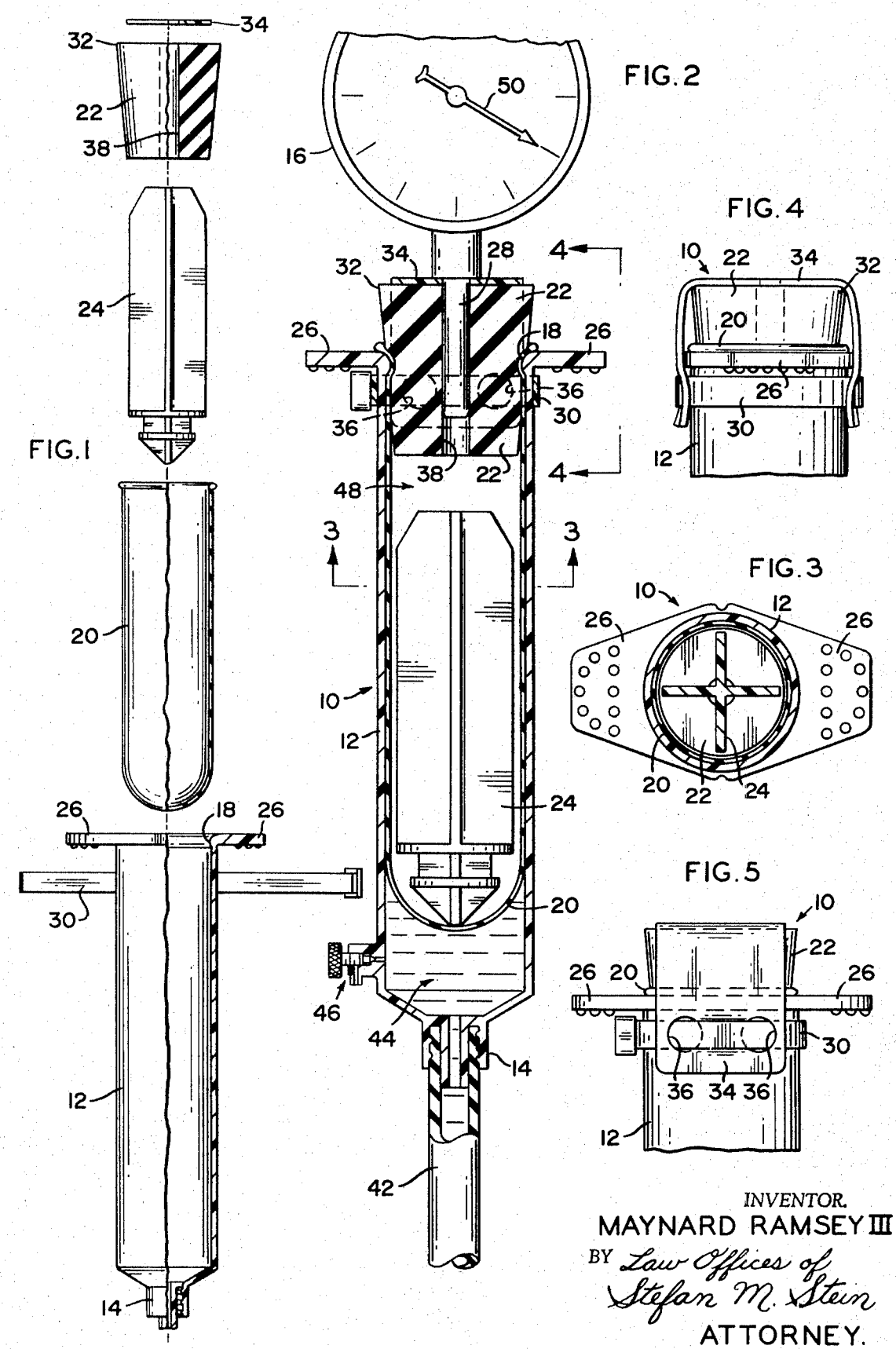

DISPOSABLE BODY FLUID PRESSURE MONITOR

This is a continuation-in-part application of my copending application, Ser. No. 881,121, filed Dec. 11, 1969 now U.S. Pat. No. 3,648,687.

BACKGROUND OF THE INVENTION

1. Field of the Invention

This invention relates to pressure indicating devices of the type used for the measurement of body fluid pressures and more particularly to a direct reading, disposable hypodermic manometer adapted for use in the measurement of arterial, venous blood and cerebrospinal fluid pressures.

2. Description of the Prior Art

The pressures of fluids in the vessels of all living things are indications of many facts which are of great value to those engaged in medical, biology and related fields. In the case of humans, the pressure in the vascular system is measured for many reasons, including diagnosis of pathology, laboratory routine for certain ailments, ascertainment of the progress of therapy, etc. For instance, the determination of venous blood pressure is an essential element in the diagnosis of a patient suspected of cardiac disease. A normal venous pressure ranges between 80–120 millimeters water, whereas elevations of venous pressure above that range are found in cases of congestive heart failure.

Similarly, cerebrospinal fluid pressure is normally 70–180 millimeters water, whereas elevated pressures may be found, for example, in cases of intracranial tumor, supperative encephalitis, and cerebral abscess, hydatid cysts, extra, subdural, subarachnoid and intra cerebral hemorrhage, meningitis, acute encephalitis, hydrocephalus, craniostenosis, cerebral edema following head injury, acute nephritis, hypertensive encephalopathy and eclampsia. Lower than normal cerebrospinal pressures may be observed in such cases as spinal block by tumor, some subdural hematomas, and intracranial space occupying lesions which produce displacement of normal structures to cause pressure coning at the foramen magnum or tentorial opening.

The most common method of obtaining arterial blood pressure has been to gradually apply constrictive pressure about the limb of the patient until the flow of blood through a vessel has been arrested, as determined by listening to a stethoscope applied over the vessel at a point distal the point of constriction. Then, upon gradual release of the constricted pressure, the beginning of the flow through the vessel can be heard and the constricted pressure is noted on the gauge reading in millimeters of mercury. The pressure that is noted is the diastolic pressure. The pressure is then further gradually released until the sounds of the flow again cease and the pressure is again noted; this being the systolic pressure. The difference between the two pressure is termed the pulse pressure. The constriction pressure heretofore has been derived from an inflatable cup connected to a mercury column manometer or to an aneroid type gauge having a dial scale calibrated in millimeters of mercury. While this common device is satisfactory for measuring the diastolic-systolic pressure range for a discreet period of time, it has the obvious disadvantage of not being able to continuously monitor the patient's blood pressure.

In the prior art, many attempts have been made to devise blood pressure gauges which are portable, inexpensive and yet provide the attending physician with an accurate determination of the patient's blood pressure. One such device employs telescopically related, spring loaded tubes, the tubes being biased in an extended position. By exerting axial pressure on the tubes against an artery until blood flow in that artery is cut off, and by monitoring the relative displacement of the tubes from the fully extended position required to produce such flow cut off, the systolic pressure is monitored. However, the means for monitoring the displacement of the tubes is often inconvenient or clumsy. For example, another prior art device is cited which employs a pointer extending from an inner tube through a longitudinal slot in an outer tube, the outer tube having calibrated markings adjacent the slot. The disadvantage with this arrangement lies in the fact that the tubes, and hence the pointer, return to the original biased position upon removal of the instrument from the body, thereby requiring the operator to take a reading while exerting direct pressure. Such a technique has been found to be inconvenient.

Generally speaking, however, the indirect methods of making fluid pressure measurements, such as the ones cited above, are not as accurate as any method which utilizes the particular fluid itself operating directly against a pressure sensing device.

However, the direct-measuring apparatus now in use for measurement of arterial-venous and cerebrospinal fluid pressures of human subjects are expensive difficult to assemble, clean and reuse. It would thus be an advantage to develop a direct intra-vessel pressure measuring device which allows for continuous monitoring of the level of pressure while at the same time being simple, inexpensive and disposable so as to eliminate the sterilization problems.

OBJECTS OF THE INVENTION

Therefore, it is an object of this invention to provide a hypodermic pressure manometer especially adapted for the measurement of arterial or vascular blood and cerebral fluid pressure, such device designed to be disposed after one use.

Another object of this invention is to provide a portable instrument for the above uses which is adapted for carrying in a doctor's valise, thus providing a useful diagnostic instrument for the general practioner.

Still another object is to provide a direct reading, self-contained, mechanical hypodermic pressure manometer which is used in conjunction with a standard aneroid manometer or other sensing device and which is disposable after each use.

A further object is to provide an apparatus for the measurement of fluid pressures in humans and animals which can be used safely, quickly and easily by laboratory technicians without any particular skill other than that provided by conventional training.

A still further object of the invention is to provide an apparatus of the character described which has no moving parts; which requires no power source for operation; which utilizes no chemicals or additional apparatus or instruments; and which is readily transportable.

Another object of this invention is to provide a manometer which is so simple and inexpensive in construction that it may be discarded after use instead of being washed and re-sterilized, and whereby the only sterilization required is at the place of manufacture where sterilization and adequate testing to assure sterility can be effected in mass production at little cost.

Other objects of the invention will in part be obvious and will in part appear hereinafter in the summary of the invention and in the detailed discussion of the preferred embodiments.

SUMMARY OF THE INVENTION

The above objects are efficiently obtained by providing a tube or barrel with a flexible diaphragm which seals the tube into an upper and lower plena. The lower plenum is connected to a suitable catheter and hypodermic needle. In one embodiment this lower plenum is filled with a suitable incompressible fluid for improved sensitivity to pressure differentials and in a second embodiment a gas such as air may be utilized. The upper plenum is adapted to receive a pressure sensing or recording instrument such as a standard aneroid manometer. In one embodiment the upper plenum may be filled with an incompressible fluid while in another embodiment a gas such as air may be utilized to transmit the pressure differentials to the manometer.

The device is designed to be sterilized and packaged at the point of manufacture and thrown away after one use. The standard pressure sensing device is attached at the point of use and because of the sterilized diaphragm, it may be used repeatedly without sterilization. In addition, this device is provided with a frangible end cover which is visibly ruptured at the time of first use thereby forestalling an accidental reuse.

The invention accordingly comprises the features of construction, combination of elements and arrangement of parts which will be exemplified in the construction hereinafter set forth and the scope of the invention will be indicated in the claims.

BRIEF DESCRIPTION OF THE DRAWINGS

FIG. 1 is an exploded view of one embodiment of the disposable manometer of the present invention.

FIG. 2 is a planar cross-sectional view of one embodiment of the disposable manometer of the present invention.

FIG. 3 is a bottom view through line 3—3 of FIG. 2.

FIG. 4 is a partial, planar view along line 4—4 of FIG. 2.

FIG. 5 is a front, sectional, planar view of the disposable manometer of this invention.

Similar reference characters refer to similar parts throughout the several views of the drawings.

DETAILED DESCRIPTION OF THE PREFERRED EMBODIMENTS

Referring now to the drawings, one device embodying the disposable manometer of the present invention is shown and generally referred to by the reference number 10. Manometer 10 comprises a tube or barrel 12 having at one end a catheter or hypodermic needle connector 14 and at the distal end a tube orifice 18 adapted to receive pressure sensing means such as standard aneroid manometer 16 or other standard pressure sensing or recording device (not shown). Inserted within tube 12 is a flexible diaphragm 20 which is placed in an airtight seal when a resilient stopper 22 or the like is fitted into tube orifice 18. Within diaphragm 20 is diaphragm opening means such as insert 24, the function of which is to insure the diaphragm 20 is in the open position shown in FIG. 2 when disposable manometer 10 is being used. Insert 24 may be made of any generalized, lightweight configuration which will freely fit within diaphragm 20 or, if liquid is utilized within diaphragm 20, discussed infra, then insert 24 may be eliminated from disposable manometer 10 completely. Surrounding tube orifice 18 are radially extending finger flanges 26 which are integral with tube 12 and may be used to aid in the insertion and removal of the nipple 28 of a standard aneroid manometer 16 or other pressure sensing or recording device (not shown) being used to sense the transmitted pressures. While flanges 26 are used to help insertion and removal of nipple 28, their primary function is to act as a stop to prevent retaining band 30 from slipping off the end of tube 12. Surrounding the outer end 32 of rubber stopper 22 are stopper retaining means in the form of an end cover 34 which serves the function of insuring that stopper 22 remains seated in an airtight relationship with tube orifice 18. End cover 34 is here shown to be generally rectangular and having holes 36 which are arranged to receive retaining band 34 as illustrated by FIG. 5. This arrangement insures that an airtight seal will remain between stopper 22 and tube orifice 18. In addition, during operation of disposable manometer 10, end cover 34 insures that stopper 22 will not be forced out of its sealing relationship with tube orifice 18 even if the pressure within tube 12 becomes very high.

In addition, end cover 34 has the secondary function of a frangible membrane which insures that disposable manometer 10 is not accidentally used a second time. End cover 34 may be made of thin plastic or any similar substance which has sufficient tensile strength to allow it to be used as the retaining means for stopper 22 while at the same time having a relatively low resistance against rupture to the penetrating, transverse force of nipple 28 as it is forced into hole 38 of stopper 22. In the alternative, a hole of smaller diameter than stopper hole 38 may be placed in end cover 34 and this hole registered over stopper hole 38 to act as a starter in the insertion of nipple 28.

In operation, the various elements of the device, excluding aneroid manometer 16, are sterilized, assembled and individually packaged at the place of manufacture. The component parts are made of inexpensive material such as plastic and the like and the device is designed to be disposed of after one use. At the point of use, the package is opened and the device removed. The manometer 10 may have a standard catheter 42 and hypodermic needle (not shown) already attached at the factory or they may be attached at the time of use. It is contemplated that the lower plenum 44 of the manometer 10 defined by the lower end of tube 12, diaphragm 20 and catheter connector 14, together with catheter 42 and a hypodermic needle (not shown), if connected, may be filled with a heparinized saline or similar solution to insure that no air is trapped in that portion of the system. Alternatively, the lower plenum 44 may contain air which will be compressed when catheter 42 is connected to a source of super-atmospheric pressure. In addition to the above it is further contemplated that bleeding means such as a valve 46 be placed in the wall of tube 12 to allow air to be bled out of the system as blood (not shown) or other fluid is drawn into catheter 42 and lower plenum 44.

Upper plenum 48 may be filled with a non-corrosive, non-compressible, liquid which will aid in the transmission of undampened pressure variations, especially if fluid is also utilized in lower plenum 44. If the plena are to be filled with air, the pulsations will be dampened. If fluid fills upper plenum 48 then there is no need for insert 24 and the embodiment of end cover 34 without hole 40 must be used in order to prevent fluid leakage prior to insertion of manometer 10. Alternatively, however, stopper hole 38 may be plugged with a removable plug (not shown) or the like to prevent leakage prior to use.

After manometer 10 is removed from its sterilized container, the user inserts aneroid manometer 16 or other sensing recording device into stopper hole 38, thereby rupturing end cover 34. When determining venous pressure, a tourniquet is applied to the upper arm of the patient and performing vein puncture with the hypodermic needle (not shown) in the usual fashion. When no fluid is utilized in either plena 44 and 48, entrance of the needle into the vein is confirmed by the visual indication of a flow of blood into catheter 42. The tourniquet is thereupon released, allowing an equilibration of pressure. At this time diaphragm 20 will transmit the pressure variations to the indicating fluid in upper plenum 48 which consequently causes registration on the manometer dial 50. After the arterial or venous pressure has been monitored, the hypodermic needle (not shown) is removed from the vein and manometer 16 removed from stopper 22. The disposable manometer 10 is then discarded.

When measuring cerebrospinal fluid pressure, the device is assembled in the same way as before. Spinal puncture is performed in a well known manner, e.g., by lying the patient on his side with his knees flexed. The area to be pierced, usually the third or fourth lumbar interspace, is prepared by sterile cleansing, then infiltrated with one percent procaine and then the hypodermic needle (not shown) is inserted into the area. Penetration into the spinal canal may be felt by the giving way of the spinal ligaments. If the needle is properly located, there will be a visual indication of the cerebrospinal fluid therein.

In so far as the specific dimensions of disposable manometer 10, it is within the contemplation of this invention that tube 12 could be of another cross section such as rectangular, triangular, oval and etc. Further, it is contemplated that catheter connector 14 be located eccentrically with tube 12 or even transversely located on the side wall of tube 12.

It is also contemplated that diaphragm 20 could be molded into tube 12 at any location along its length or, it could be attached to catheter connector 14 or any other suitable location to isolate lower and upper plena 44 and 48.

It is also contemplated that the hypodermic needle be connected directly to tube 12, hence dispensing with catheter 42.

The various elements of manometer 10 may be made of any suitably ridged, lightweight substance which will facilitate easy handling and use.

It will thus be seen that the objects set forth above and those made apparent from the preceding detailed description are efficiently attained and since certain changes may be made in the above construction without departing from the scope of the invention, it is intended that all matter contained in the above detailed description or shown in the accompanying drawings, shall be interpreted as illustrative and not in a limiting sense.

It is also understood that the following claims are intended to cover all the generic and specific features of the invention herein described, and all statements of the scope of the invention, which as a matter of language, might be said to fall therebetween.

Now that the invention has been described:

What is claimed is:

1. A disposable device for use in a fluid-pressure monitor, comprising an elongated tubular container, means on one end of said tubular container adapted to place the interior of said tubular container in communication with the system to be monitored, a flexible impervious diaphragm received within said tubular structure, said diaphragm separating said tubular container into upper and lower chambers, insert means placed within said upper chamber to maintain said diaphragm in an extended position, a one-hole resilient stopper mounted in said other end of said tubular container, said stopper extending into said diaphragm to form a fluid tight seal between the internal surface of said tubular container, said diaphragm, and the external surface of said stopper, said stopper being adapted to receive pressure sensing means therein, a stopper cover engaging said stopper, said stopper cover being biased against the external surface of said container in a fixed relationship by a retaining band to prevent accidental dislodging of said stopper.

2. A disposable device as claimed in claim 1, including pressure-sensing means removably inserted into said stopper hole and sealingly received therein to record pressure variations within said upper chamber.

3. A disposable device as claimed in claim 2 wherein said pressure sensing means comprises a standard aneroid manometer having a pressure sensing nipple.

4. A disposable device as claimed in claim 1, wherein said elongated tubular structure has said other end terminating in a radial flange which acts as a stop to prevent said retaining band from slipping off the end of said tubular container.

5. A disposable, device as claimed in claim 1, wherein said stopper cover is seated over said stopper to cooperate with said stopper to seal said stopper hole.

6. A disposable device as claimed in claim 1, wherein said stopper cover is a frangible membrane.

7. A disposable device as claimed in claim 1, wherein said lower chamber contains a saline solution.

8. A disposable device for use in a fluid-pressure monitor comprising an elongated tubular container having a flanged end and a constricted flow end, means on said constricted flow end of said tubular container adapted to place the interior of said tubular container in direct communication with the fluid system to be monitored, a flexible impervious finger-shaped diaphragm having a closed lower end and an open upper end received within the flanged end of said tubular container separating said tubular container into an upper chamber and a lower chamber, insert means placed within said upper chamber to maintain said diaphragm in an extended position, bleeding means connected to the wall of said tubular container and communicating with said lower chamber, a one-hole resilient stopper frictionally engaging said diaphragm, the open end section of the diaphragm being sealingly positioned between internal surface of said tubular container and the external surface of said stopper, a frangible plastic top cover contacting the top of said stopper to cooperate with said stopper to form a fluid-impermeable barrier, said top cover being secured to the external surface of said tubular container below said flange by a retaining band.

* * * * *